United States Patent
Pelech et al.

(10) Patent No.: US 6,243,585 B1
(45) Date of Patent: Jun. 5, 2001

(54) WIRELESS TELECOMMUNICATIONS NETWORK WHOSE FACILITIES ARE MOBILE AND WHOSE TOPOLOGY IS DYNAMIC

(75) Inventors: James Igor Pelech, Chester, NJ (US); Bulent Yener, Manhattan, NY (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/083,553

(22) Filed: May 22, 1998

(51) Int. Cl.$^7$ .................................................. H04Q 7/20
(52) U.S. Cl. ..................... 455/449; 455/436; 455/11.1
(58) Field of Search .................................. 455/436, 435, 455/433, 449, 11.1, 13.1, 560, 561, 445, 411

(56) References Cited

U.S. PATENT DOCUMENTS

| | | | | |
|---|---|---|---|---|
| 4,539,706 | * | 9/1985 | Mears et al. | 455/11 |
| 5,276,686 | * | 1/1994 | Ito | 370/95.1 |
| 5,291,544 | * | 3/1994 | Hecker | 455/436 |
| 5,442,683 | * | 8/1995 | Hoogeveen | 455/403 |
| 5,521,962 | * | 5/1996 | Chavez, Jr. | 455/445 |
| 5,729,826 | * | 3/1998 | Gavrilovich | 455/11.1 |
| 5,787,111 | * | 7/1998 | Gilmore | 375/200 |
| 5,970,410 | * | 10/1999 | Carney et al. | 455/446 |
| 6,021,329 | * | 2/2000 | Kornestedt et al. | 455/445 |

OTHER PUBLICATIONS

"A New Hierarchical Routing Protocol for Dynamic Multi-hop Wireless Networks" by Ian F. Akyildiz, Wei Yen and Bulent Yener, published prior to May 22, 1998.

Tsai et al., "An Adaptive Hierarchical Routing Protocol", IEEE Transactions on Computers, vol. 38, No. 8, Aug. 1989.*

Ho et al., "Dynamic Hierarchical Database Architecture for Location Management in PCS Network", IEEE Transactions on Networking, vol. 5, No. 5, Oct. 1997.*

Veerarghavan, et al., Mobility and Connection Management in a Wireless ATM LAN, IEEE Journal on Selected areas in Communications, vol. 15, No. Jan. 1997.*

Akyildiz et al. "A New Hierarchical Routing Protocol for Dynamic Multihop Wireless Networks", IEEE 1997.*

* cited by examiner

Primary Examiner—Dwayne D. Bost
Assistant Examiner—Joy Redmon
(74) Attorney, Agent, or Firm—DeMont & Breyer, LLC; Jason Paul DeMont; Wayne S. Breyer

(57) ABSTRACT

A wireless telecommunications network is disclosed in which all of the facilities (e.g., wireless switching centers, base stations, etc.) are mobile, and, therefore, are capable of being moved while the system provides wireless telecommunications service to one or more wireless terminals. In particular, the present invention is advantageous in that any or all of the various facilities can move relative to each other without the need to suspend the provision of service.

An illustrative embodiment of the present invention comprises: a plurality of base stations in a hierarchical network, wherein: each of the base stations comprises the identity of its filial base stations, if any, and wirelessly communicates with its filial base stations; and each of the base stations comprises the identity of its lineal base stations, if any.

24 Claims, 7 Drawing Sheets

100

WIRELESS TELECOMMUNICATIONS NETWORK WHOSE FACILITIES ARE MOBILE AND WHOSE TOPOLOGY IS DYNAMIC

FIELD OF THE INVENTION

The present invention relates to telecommunications in general, and, more particularly, to: (1) a packet-switched wireless telecommunications network in which the facilities composing the network are mobile, and (2) a set of protocols for reliably routing packets through the network while the topology of the network is changing.

BACKGROUND OF THE INVENTION

FIG. 1 depicts a schematic diagram of a portion of a wireless telecommunications system in the prior art, which system provides wireless telecommunications service to a number of wireless terminals (e.g., wireless terminals 101-1 through 101-3) that are situated within a geographic region. The heart of a typical wireless telecommunications system is a wireless switching center ("WSC"), which also may be known as a mobile switching center or mobile telephone switching office. Typically, a wireless switching center (e.g., WSC 120) is connected to a plurality of base stations (e.g., base stations 103-1 through 103-5) that are dispersed throughout the geographic region serviced by the system and to the local and long-distance telephone and data networks (e.g., local-office 130, local-office 138 and toll-office 140). A wireless switching center is responsible for, among other things, establishing and maintaining a call between a first wireless terminal and a second wireless terminal or, alternatively, between a wireless terminal and a wireline terminal (e.g., wireline terminal 150), which is connected to the system via the local and/or long-distance networks.

The geographic region serviced by a wireless telecommunications system is partitioned into a number of spatially distinct areas called "cells." As depicted in FIG. 1, each cell is schematically represented by a hexagon. In practice, however, each cell has an irregular shape that depends on the topography of the terrain surrounding the cell. Typically, each cell contains a base station, which comprises: (1) the radios and antennas that the base station uses to communicate with wireless terminals in that cell; and (2) the transmission equipment that the base station uses to communicate with the wireless switching center.

For example, when a user of wireless terminal 101-1 desires to transmit information to a user of wireless terminal 101-2, wireless terminal 101-1 transmits a packet bearing the user's information to base station 103-1. The packet is then relayed by base station 103-1 to wireless switching center 120 via wireline 102-1. Because wireless terminal 101-2 is in the cell serviced by base station 103-1, wireless switching center 120 returns the packet back to base station 103-1, which relays it to wireless terminal 101-2.

The demand for wireless service is never uniform throughout a geographic region. For example, the demand for service is likely to be greater in urban areas and along highways than in wilderness areas. Furthermore, the demand for wireless service in any area changes with the time of day, the day of the week, the seasons of the year, and other factors. For example, a parade or football game or traffic jam can corral a large number of people with wireless terminals into a small area, which temporarily increases the demand in that area.

In practice, the base stations in a wireless telecommunications system are traditionally positioned throughout a geographic region without consideration for where in that region the demand for wireless service will be heaviest or lightest. Instead, base stations are typically positioned uniformly throughout a geographic region (e.g., one base station every 5 miles) in such a manner that each base station services an area of approximately equal size. This implies that some base stations will be underutilized while others are heavily utilized and possibly overwhelmed.

In other words, because the base stations are fixed and uniformly dispersed, but the demand for service is not, there will typically be a mismatch between where the base stations exist and where they are needed. This causes the owner of the wireless telecommunications system to lose money in two ways. First, if the demand for service in an area is not met, then the owner cannot charge for service that is not provided. Second, the owner must spend considerable sums of money on base stations that are underutilized.

One solution is to position more base stations in those areas in which the demand for service is expected to be higher (e.g., at a football stadium). But if the demand for service varies with time in those areas, the base stations in those areas will spend a considerable percentage of the time underutilized. This, as stated above, costs the owner of the wireless telecommunications system to lose money.

Therefore, the need exists for a wireless telecommunications system in which the demand for wireless service is more closely matched by the presence of facilities to meet that demand, even when the demand for service varies with time.

SUMMARY OF THE INVENTION

The present invention is a wireless telecommunications network in which all of the facilities (e.g., wireless switching centers, base stations, etc.) are mobile, and, therefore, are capable of being moved to where they are needed. This allows a wireless service provider to move the facilities into those areas where the demand is high and remove facilities from those areas where the demand is low.

Furthermore, the present invention is particularly advantageous in that all of the various facilities can provide wireless service while the facilities move. In other words, a wireless switching center or base station does not need to be taken out of service, moved, and then brought back online in its new location.

To accomplish this, the illustrative embodiment operates as a packet network in which the wireless switching centers, base stations and wireless terminals are all nodes in the network. Because the illustrative embodiment is a packet network, each wireless switching center and base station contains a routing table, which instructs them how to route packets through the network. And furthermore, because each of the wireless switching centers and base stations are mobile, the illustrative embodiment comprises a set of procedures for updating the various routing tables as the wireless switching centers and base stations are handed off from one to another.

The wireless switching centers and base stations constituting the illustrative embodiment are arranged in a novel network topology, which enables them to move and be handed off without an interruption is service. For example, the wireless switching centers form a ring network, which constitutes the backbone of the illustrative embodiment. Furthermore, each wireless switching center employs one or more base stations that are configured in a hierarchical network.

DETAILED DESCRIPTION

Road Map to the Detailed Description

Because the illustrative embodiment of the present invention comprises many facets at different levels of abstraction, a road map to the detailed description will assist in comprehending each facet and understanding its relationship to the others.

Figure 1:
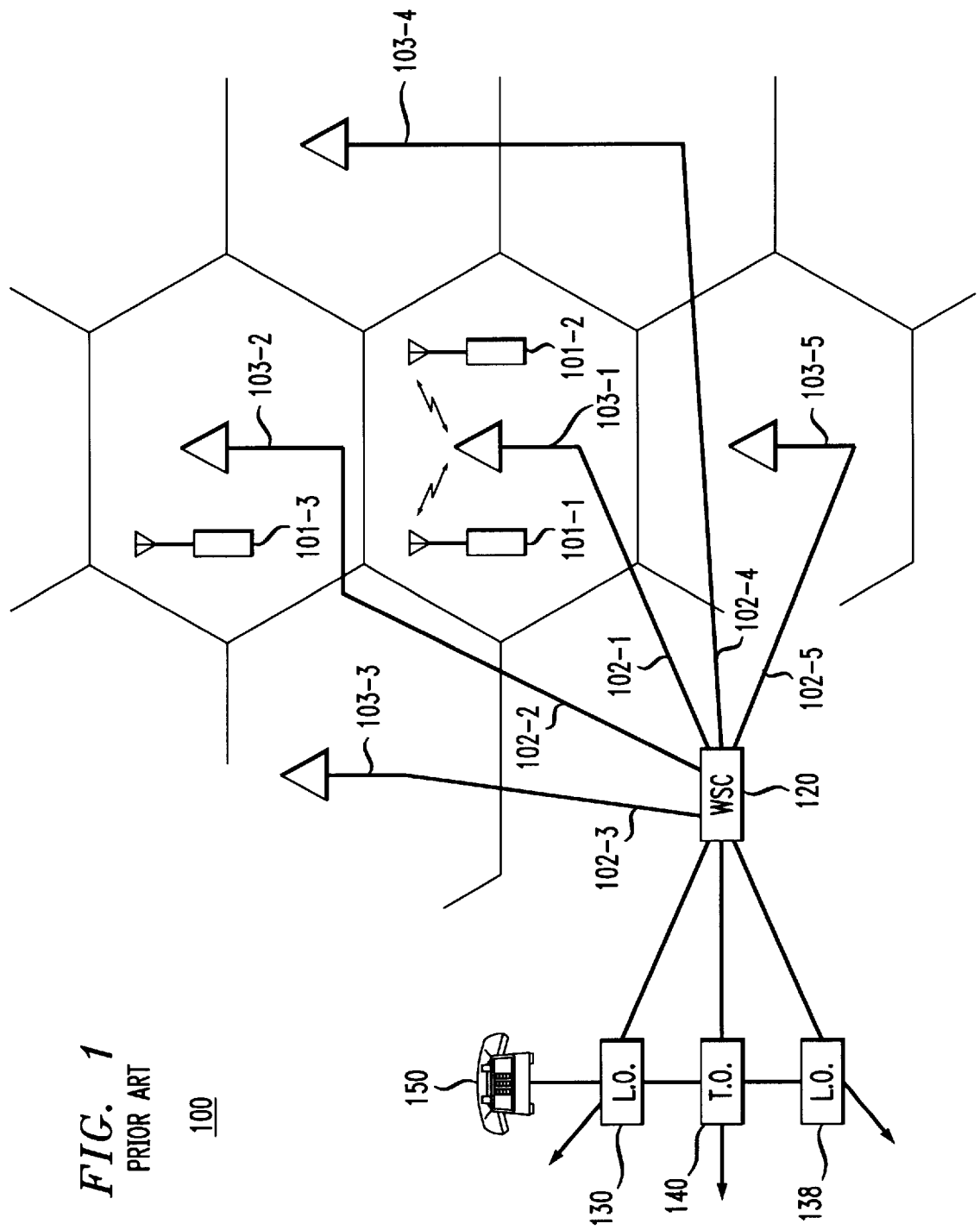
FIG. 1 depicts a schematic diagram of a wireless telecommunications system in the prior art.
Figure 2:
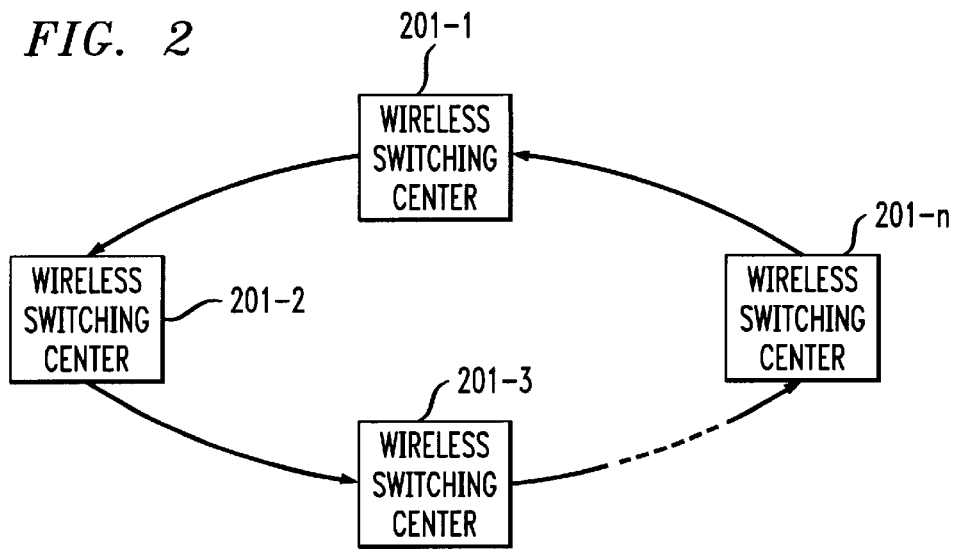
FIG. 2 depicts a schematic diagram of the backbone of the illustrative embodiment

The illustrative embodiment of the present invention is a wireless telecommunications network that is capable of providing wireless telecommunications service to one or more wireless terminals. At the highest level of abstraction, as shown in FIG. 2, the wireless telecommunications network comprises a plurality of interconnected wireless switching centers. Therefore, the detailed description first teaches the structure of the wireless switching centers and their relationship to each other. Furthermore, because the wireless switching centers are mobile and can be handed off, the detailed description teaches how to manage the hand off of a wireless switching center.

Figure 3:
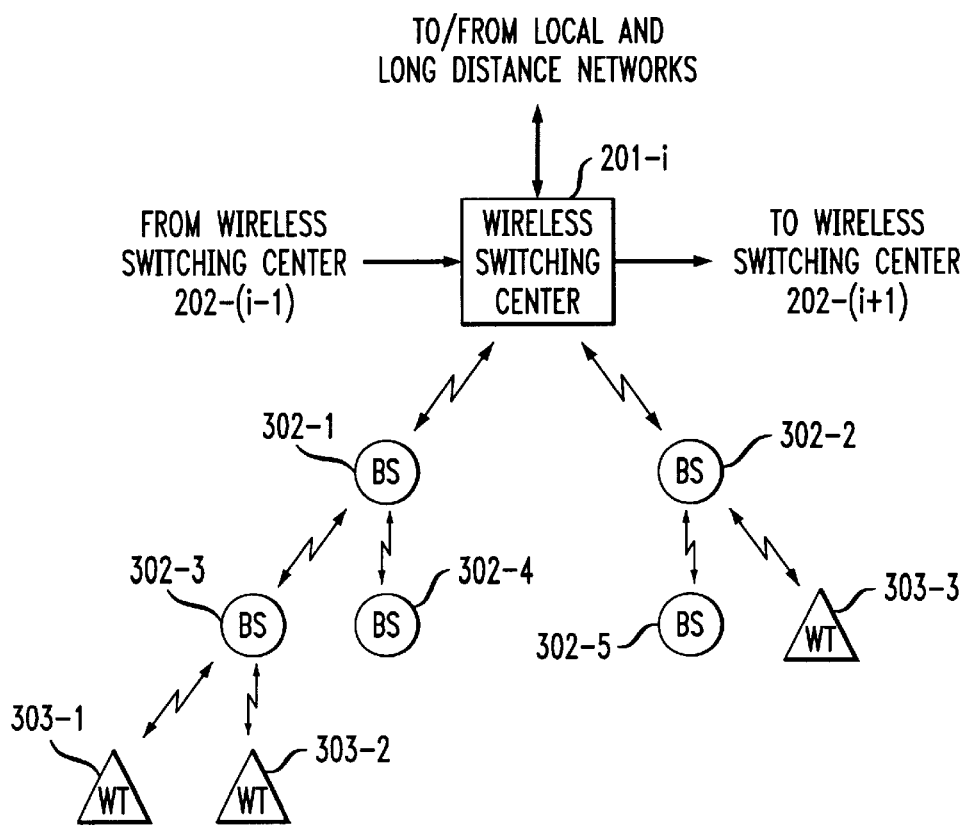
FIG. 3 depicts a schematic diagram of a wireless switching center and a plurality of base stations and wireless terminals serviced by it in a hierarchical network.

At the next level of abstraction, as shown in FIG. 3, each wireless switching center employs one or more base stations in a hierarchical network to service one or more wireless terminals. Therefore, the detailed description next teaches how the wireless switching center and base stations interoperate in accordance with the illustrative embodiment.

The illustrative embodiment is a packet network, and, therefore, the detailed description next teaches the format of the routing tables in each part of the network and teaches how packets are properly routed through each node in the network.

Figure 7:
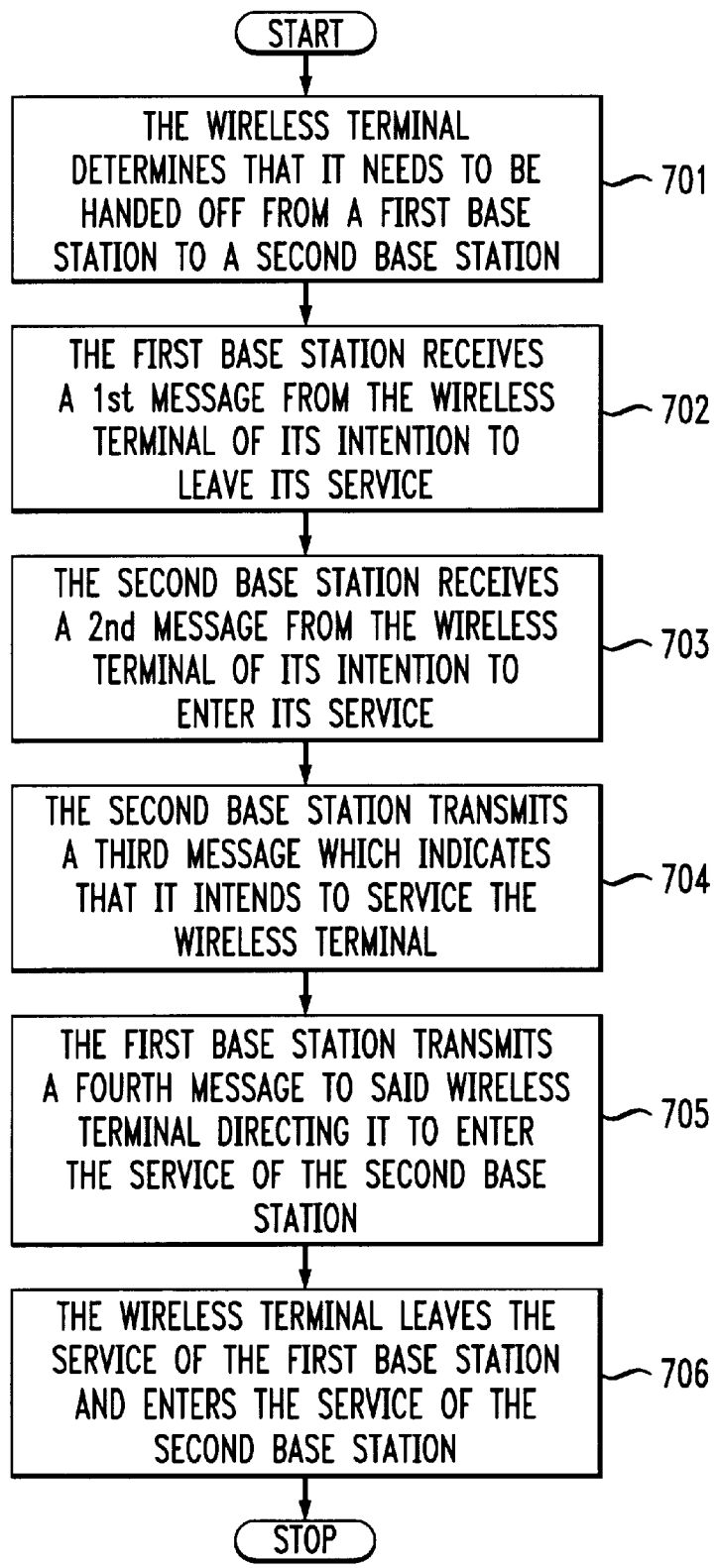
FIG. 7 depicts a flowchart of the steps involved in handing off a wireless terminal in accordance with the illustrative embodiment of the present invention.
Figure 8:
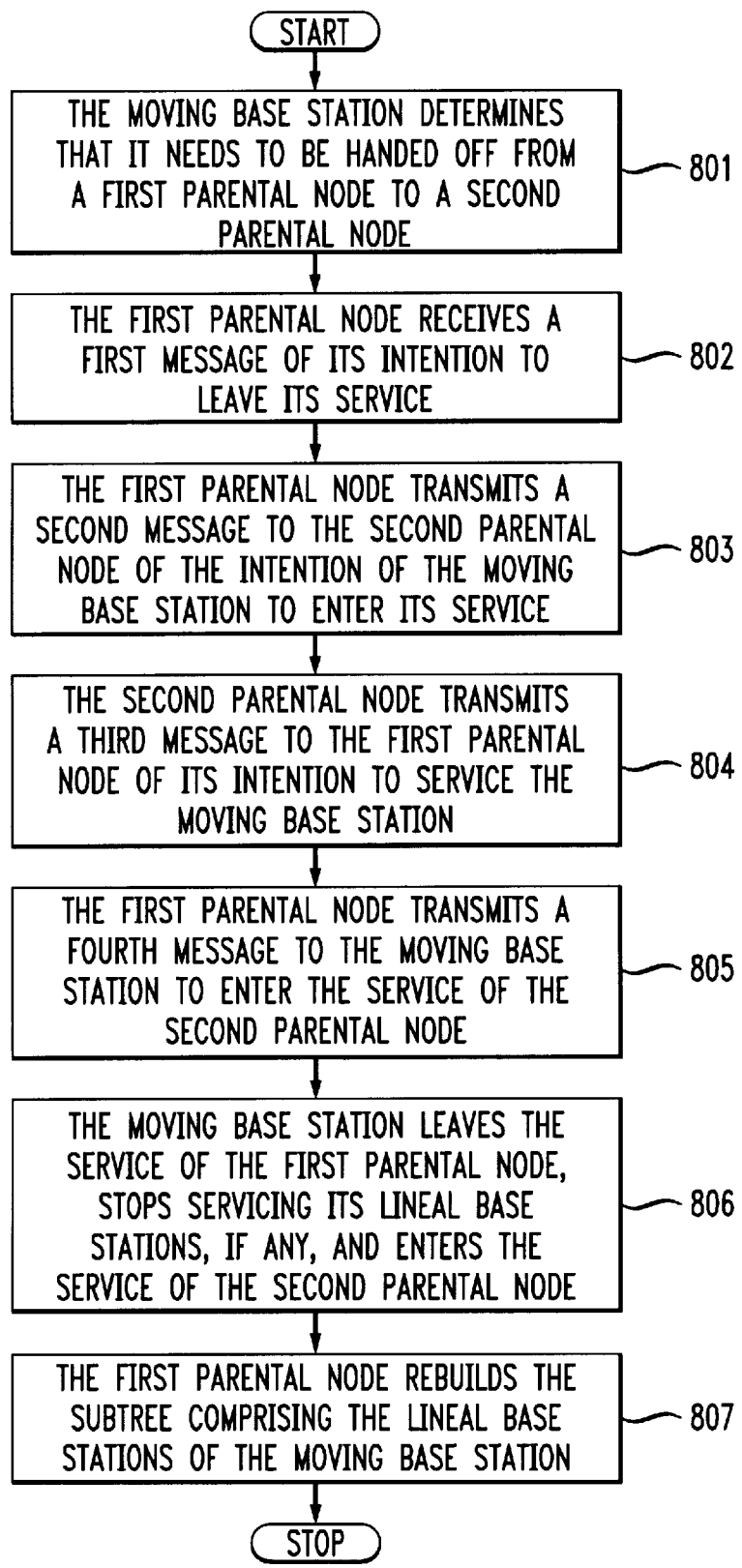
FIG. 8 depicts a flowchart of the steps involved in handing off a base station in accordance with the illustrative embodiment of the present invention.

Because the base stations and wireless terminals are mobile, the detailed description next teaches how base stations and wireless terminals are handed off. FIG. 7 depicts the steps involved in handing off a wireless terminal and FIG. 8 depicts the steps involved in handing off a base station.

Furthermore, because both a base station and one or more of the wireless terminals it serves can all be involved in different hand offs at the same time (i.e., the base station is moving in one direction while the wireless terminal it serves is moving in another), the detailed description next teaches how multiple hand offs are orchestrated so as to maintain the integrity of the system and avoid disruptions in service.

The Wireless Telecommunications Network

The illustrative embodiment of the present invention is a wireless telecommunications network, which provides wireless telecommunications service to one or more wireless terminals. FIG. 2 depicts a schematic diagram of the backbone of the illustrative embodiment, which comprises a plurality of wireless switching centers, 201-1 through 201-n, in a ring network. Although the wireless switching centers are depicted in the illustrative embodiment in a ring network, it will be clear to those skilled in the art, how to make and use embodiments of the present invention in which the wireless switching centers intercommunicate in a network with any topology.

Each wireless switching center is responsible for, among other things, establishing and maintaining a call between two wireless terminals or, alternatively, between a wireless terminal and a wireline terminal, which is connected to the wireless switching center via the local and/or long-distance networks (not shown).

When a call is between a first wireless terminal serviced by a first wireless switching center and a second wireless terminal serviced by a second wireless switching center, the wireless switching centers pass the traffic comprising the call amongst themselves via a ring network. As is described in detail below, this enables the illustrative embodiment to provide telecommunications service reliably and inexpensively even while the elements of the embodiment are moving.

In accordance with a ring network, each wireless switching center communicates directly with two others. In particular, each wireless switching center:

1) transmits telecommunications traffic to one and only one other wireless switching center, and 2) receives telecommunications traffic from one and only one other wireless switching center, such that all of the wireless switching centers are nodes in the ring.

Although wireless switching centers in the prior art are typically immobile, some or all of the wireless switching centers in accordance with the illustrative embodiment are mobile. For example, each wireless switching system in accordance with the illustrative embodiment can be, for example, truck or boat-mounted (as part of a terrestrial system), airborne (as part of an aerial system), or in orbit (as part of a satellite-based system). The fact that some or all of the wireless switching centers are mobile has several significant implications.

First, the mobility of the wireless switching centers is advantageous because it enables them to be moved into an area where they are needed and removed from an area where they are not needed or desired. For example, each wireless switching center is capable of providing service to a finite number of wireless terminals (e.g., 25,000 wireless terminals). If a parade or football game or traffic jam is corralling a large number of people with wireless terminals into a small geographic region, the wireless switching center (s) servicing that region may become overwhelmed. In that case, it may be advantageous to move another wireless switching center into that region to relieve the burden on the center(s) already servicing that region. The mobility of the wireless switching centers enables that move.

Second, because each wireless switching center is mobile, its communications with other wireless switching centers are via wireless links, in contrast to wireline links.

Third, because the wireless switching centers are mobile, their relative position can change and the distance between two directly communicating centers can change. If the distance between two directly communicating centers increases too much, it may not be possible for them to maintain a direct communications and the ring will break. In that case, the wireless switching centers will communicate amongst themselves, in whatever way possible, and will attempt to reconstitute the ring, albeit with the wireless switching centers in a new order in the ring.

In other words, the ring of wireless switching centers will attempt to move or hand off a moving wireless switching center to another position in the ring. Alternatively, if it is not possible to reconstitute the ring with the moving wireless switching center, then that wireless switching center will be omitted from the ring and the remaining wireless switching centers will reconstitute a new ring network without the omitted wireless switching center.

As suggested above, the number of wireless switching centers in the ring can change over time for many reasons. For example, as stated above, a new wireless switching center can be added to the ring to increase the traffic capacity of the network, in general, or to assist a particularly overburdened wireless switching center. Alternatively, a wireless switching center can be taken out of the ring for maintenance or to lower the overall operating cost of the network. In either case, when a wireless switching center enters or exits the ring, the remaining wireless switching centers communicate amongst themselves, in well-known fashion, to reconstitute the ring.

In accordance with the illustrative embodiment, a wireless switching center does not service the wireless terminals directly, but uses one or more base stations to do so.

A Wireless Telecommunications System

FIG. 3 depicts a schematic diagram of wireless switching center 201-i and five base stations, 302-1 through 302-5, which service three wireless terminals, 303-1 through 303-3. Although there are five base stations and three wireless terminals depicted in FIG. 3, it will be clear to those skilled in the art how to make and use embodiments of the present invention in which there are any number of base stations and any number of wireless terminals.

All of the base stations serviced by a wireless switching center form a hierarchical network, wherein the wireless switching center is the root in the hierarchical network. For the purpose of this specification, a "hierarchical network" is a network connecting two or more nodes in which there is only one path between each pair of nodes and one of the nodes is designated as the root.

Figure 4:
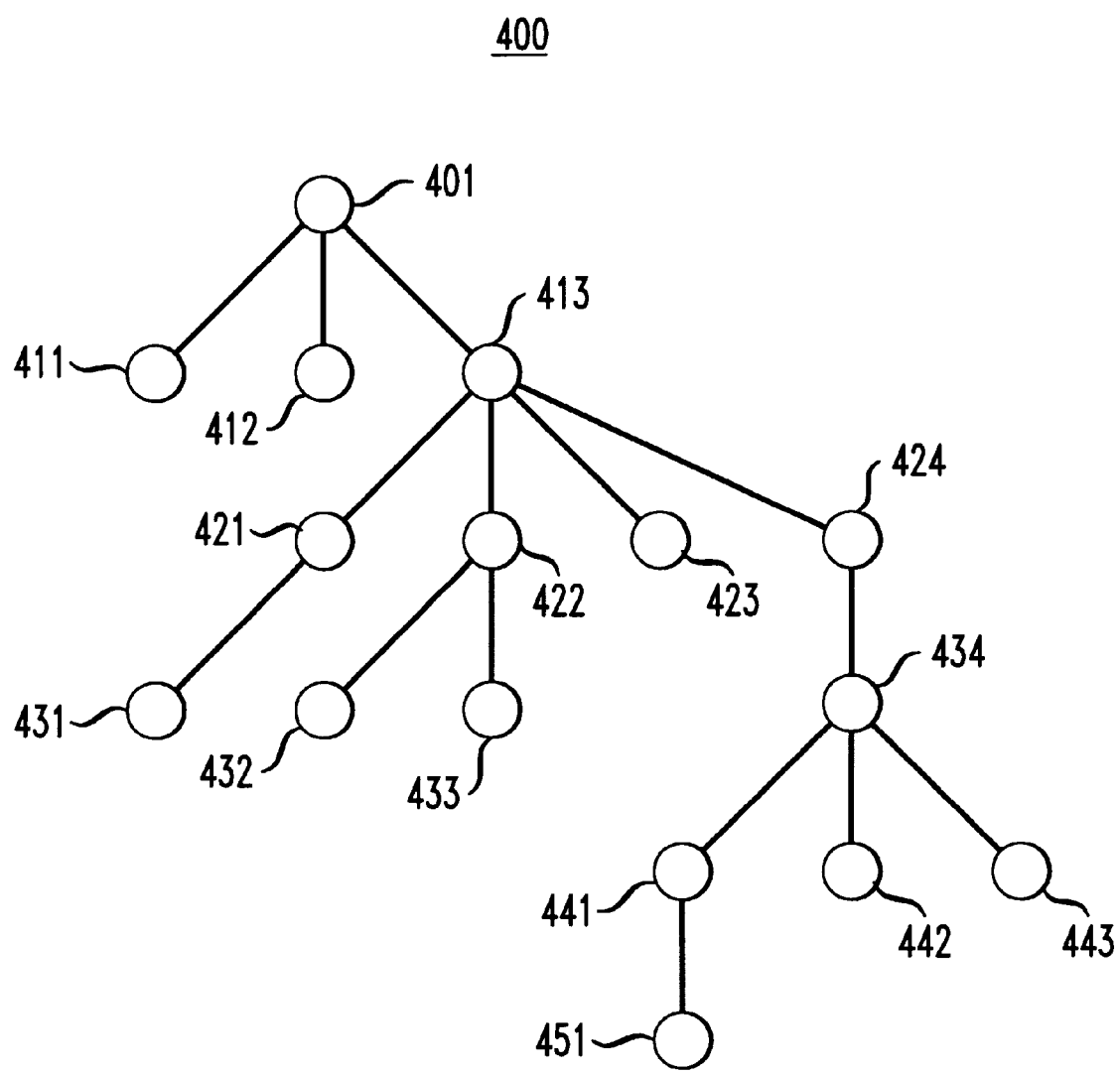
FIG. 4 depicts a schematic diagram of an illustrative hierarchical network.

Because the wireless switching center and base stations are arranged in a hierarchical network, several terms should be defined so that nodes in the network can be discussed unambiguously. FIG. 4 depicts an illustrative hierarchical network, which will assist in understanding the various terms defined and used in this specification with regard to hierarchical networks. Hierarchical network 400 comprises nodes 401 through 451, wherein node 401 is the root.

For the purpose of this specification:

the "ancestral" nodes of a given node are defined as all of the nodes, if any, between the given node and the root, including the root. For example, the ancestral nodes of node 422 are notes 413 and 401. One corollary to this definition is that the root has no ancestral nodes, but all other nodes have at least one ancestral node (the root).

a "parental" node of a given node is defined as only that node, if any, adjacent to the given node in the path between the given node and the root, including the root. For example, the parental node of node 422 is node 413 and the parental node of node 411 is node 401. One corollary to this definition is that the root has no parental node, whereas all other nodes in the hierarchy each have exactly one parental node. A second corollary is that a parental node is also an ancestral node, but an ancestral node is not necessarily a parental node.

the "lineal" nodes of a given node are defined as all of the nodes, if any, that must communicate through the given node to communicate with the root. For example, the lineal nodes of node 424 are nodes 434, 441, 442, 443 and 451. One corollary to this definition is that all of the nodes other than the root are lineal nodes of the root.

the "filial" nodes of a given node are defined as all of the nodes, if any, adjacent to the given node in the direction away from the root. For example, the filial nodes of node 413 are nodes 421, 422, 423, and 424. One corollary to this definition is that a filial node is also a lineal node, but a lineal node is not necessarily a filial node.

Although base stations in the prior art are typically immobile, some or all of the base stations in accordance with the illustrative embodiment are mobile. For example, each base station can be, for example, truck or boat-mounted (as part of a terrestrial system), airborne (as part of an aerial system), or in orbit (as part of a satellite-based system). The fact that some or all of the base stations are mobile has several significant implications.

First, the mobility of the base stations is advantageous because it enables them to be moved into an area where they are needed and removed from an area where they are not needed or desired. For example, each base station is capable of providing service to a finite number of wireless terminals (e.g., 1000 wireless terminals). If a parade or football game or traffic jam is corralling a large number of people with wireless terminals into a small geographic region, the base station(s) servicing that region may become overwhelmed. In that case, it may be advantageous to move another base station into that region to relieve the burden on the base station(s) already servicing that region. The fact that the base station is mobile enables that flexibility.

Second, because each base station is mobile, its communications with the wireless switching centers, base stations and wireless terminals are via wireless telecommunications links.

Third, because the base stations are mobile, their relative position can change and the distance between a filial base station and its parental node can change. If the distance between a filial base station and its parental node increases too much, their communications link may break.

In that case, the base stations and wireless switching center communicate amongst themselves and attempt to reconstitute the hierarchy, albeit with a new topology. In other words, the moving base station initiates a hand off to another wireless switching center or base station. Alternatively, if it is not possible to reconstitute the hierarchy with the moving base station, then that base station will be omitted from the hierarchy and the wireless switching center and remaining base stations will reconstitute a new hierarchy without the moving base station.

In a typical wireless telecommunications system in the prior art, all of the base stations are directly connected to the wireless switching center in a network with a star topology (i.e., all of the base stations are filial base stations). In contrast, in accordance with the present invention, some of the base stations may be indirectly connected to the wireless switching center through other base stations. Because an ancestral base station may service one or more lineal base stations in addition to serving (directly or indirectly) one or more wireless terminals, an increased demand is placed on the ancestral base station and on the communications links between it and the wireless switching center.

For example, as shown in FIG. 3, base station 302-1 is likely to have greater demands placed on it than does base station 302-2, because base station 302-1 has more lineal base stations and is servicing (albeit indirectly) more wireless terminals. Similarly, the communications link between base station 302-2 and wireless switching center 201-i is likely to carry more traffic than the link between base station 302-2 and wireless switching center 201-i, because base station 302-1 has more lineal base stations and is servicing (albeit indirectly) more wireless terminals.

To prevent unnecessary demands on any ancestral base station, whenever a wireless switching center and two or more base stations reconstitute a hierarchy, for whatever reason, the flattest possible hierarchy is desired (i.e., the hierarchy wherein each base station has the fewest number of ancestral base stations). This reduces the demands on each base station and each communications link as much as possible.

Each wireless terminal communicates with a base station, in well-known fashion, using any wireless technology (e.g., frequency-division multiple access, time-division multiple access, code-division multiple access, etc.) and is handed off from one base station to another as described below in conjunction with FIG. 7.

The illustrative embodiment is a packet network. Each message in the embodiment is partitioned into a succession of self-contained packets, in well-known fashion. This is true whether the message originates with a wireless switching center, a base station or a wireless terminal and whether the destination is a wireless switching center, a base station or a wireless terminal. It will be described later why a wireless switching center or a base station can be the sender or recipient of a message. Each packet is created by its sender and appended with the address of the destination and travels to its destination independently of the other packets.

Each wireless switching center knows the identity of the next wireless switching center in the ring and comprises a routing table which includes:

(1) the identity of each lineal base station it serves,
(2) the identity of each wireless terminal is serves,
(3) the identity of the filial base station that is an ancestral base station to each lineal base station and wireless terminal, and
(4) the time when each entry was last made or updated.

In other words, each wireless switching center knows which base stations and wireless terminals its serves and which filial base station to give a packet to so that the filial base station can forward the packet to its destination. For example, Table 1 illustrates a routing table for wireless switching center 201-i in FIG. 3.

TABLE 1

Routing Table for Wireless Switching Center 201-i

| Identity of Lineal Base Stations and Wireless Terminals | Filial Base Station | Time Stamp |
|---|---|---|
| Base Station 302-1 | 302-1 | 3:46:34 PM Aug. 13, 1997 |
| Base Station 302-2 | 302-2 | 5:51:38 AM Aug. 14, 1997 |
| Base Station 302-3 | 302-1 | 2:42:39 PM Aug. 14, 1997 |
| Base Station 302-4 | 302-1 | 8:34:09 AM Aug. 12, 1997 |
| Base Station 302-5 | 302-2 | 11:01:19 PM Aug. 13, 1997 |
| Wireless Terminal 303-1 | 302-1 | 5:44:11 PM Aug. 15, 1997 |
| Wireless Terminal 303-2 | 302-1 | 6:13:31 AM Aug. 15, 1997 |
| Wireless Terminal 303-3 | 302-2 | 12:17:18 PM Aug. 15, 1997 |

For example, from the last row in Table 1 it can be seen that if wireless switching center 201-i desires to forward a packet to wireless terminal 303-3, wireless switching center 201-i should give the packet to filial base station 302-2. Furthermore, each routing table includes a time stamp that indicates when the entry was last updated. The purpose of the time stamp is discussed below.

Figure 5:
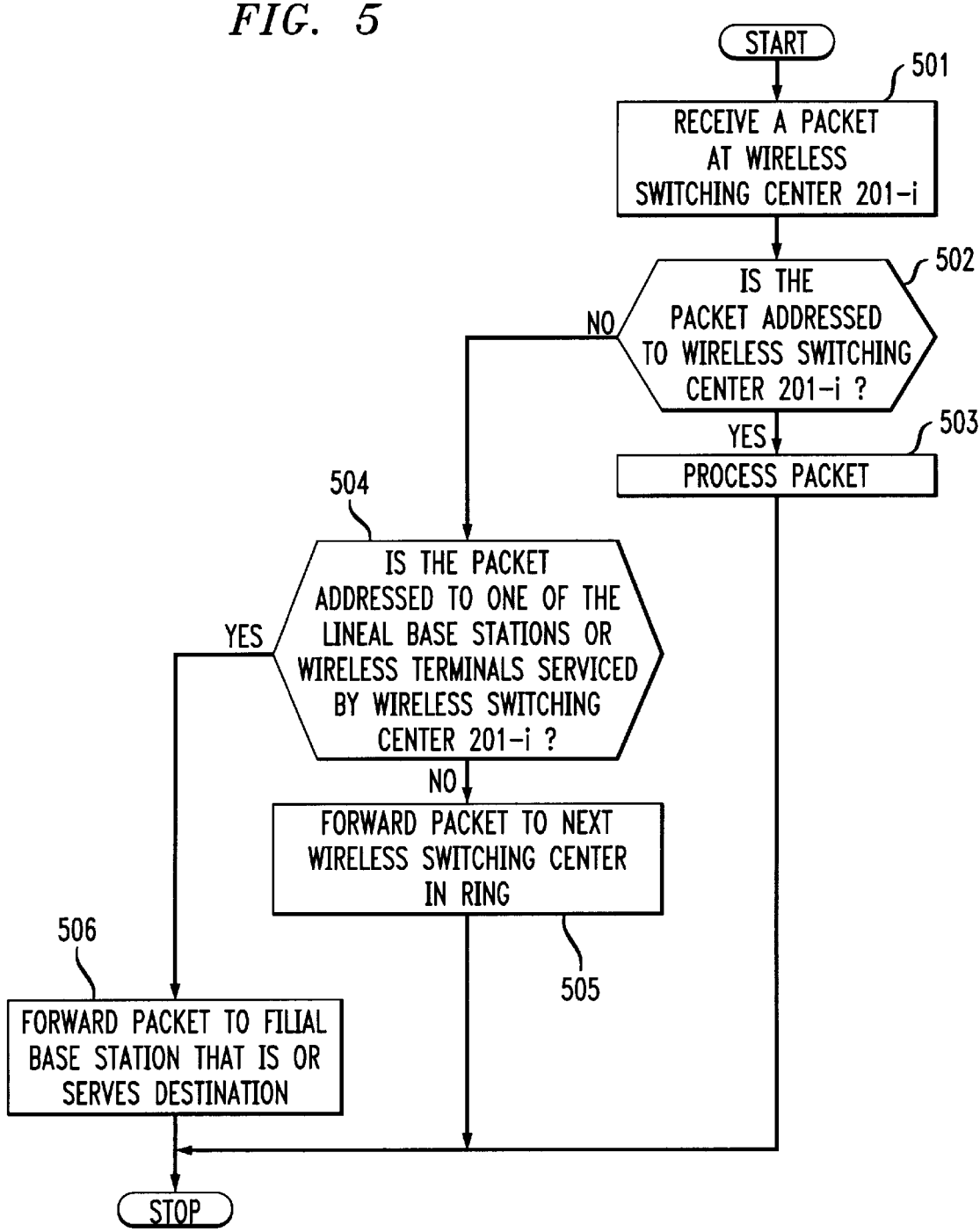
FIG. 5 depicts a flowchart of the operation of wireless switching center 201-i as it pertains to the routing of packets received by it.

FIG. 5 depicts a flowchart of the operation of wireless switching center 201-i as it pertains to the routing of packets received by it.

At step 501, wireless switching center 201-i receives a packet from either the predecessor wireless switching center in the ring (i.e., wireless switching center 201-(i−1)) or a filial base station.

At step 502, wireless switching center 201-i examines the address on the packet and determines if the packet is destined for itself or not. As is described below, there are several instances in which a packet will be addressed to a wireless switching center for administration purposes. If the packet is addressed to wireless switching center 201-i, then control passes to step 503, and wireless switching center 201-i reads and processes the packet, as described below. Alternatively, if the packet is not addressed to wireless switching center 201-i, then control passes to step 504.

At step 504, wireless switching center 201-i determines whether the packet is addressed to one of the lineal base stations or wireless terminals it serves. Wireless switching center 201-i can perform this function by comparing the address in the packet to the entries in the first column of Table 1. If the packet is addressed to one of the lineal base stations or wireless terminals is serves, then control passes to step 506; if not control passes to step 505.

At step 505, wireless switching center 201-i has determined that the packet is not addressed to it or to one of the lineal base stations or wireless terminals it serves, and, therefore, wireless switching center 201-i forwards the packet to the next wireless switching center in the ring (i.e., wireless switching center 201-(i+1)). The next wireless switching center in the ring receives the packet, as described in step 501 and begins the process outlined in FIG. 5.

At step 506, wireless switching center 201-i has determined that the packet is addressed to one of the lineal base stations or wireless terminals it serves, and, therefore, wireless switching center 201-i gives the packet to the filial base station associated with the lineal base station or to the wireless terminal directly. The identity of that filial base station is found in the second column of Table 1 in the row associated with the destination of the packet.

Each base station is responsible for routing packets as well as each wireless switching center. Therefore, each base station knows the identity of its parental node (whether a base station or a wireless switching center) and comprises a routing table which includes:

(1) the identity of each lineal base station it serves,
(2) the identity of each wireless terminal it serves,
(3) the identity of the filial base station that is an ancestral base station to each lineal base station and wireless terminal, and
(4) the time when each entry was last made or updated.

In other words, each base station knows which base stations and wireless terminals its serves and which filial base station to give a packet to so that the filial base station can forward the packet to its destination. Table 2 illustrates a routing table for base station 302-1 in FIG. 3, which has the same structure as the table for wireless switching center 201-i.

TABLE 2

Routing Table for Base Station 302-1

| Identity of Lineal Base Stations and Wireless Terminals | Filial Base Station | Time Stamp |
| --- | --- | --- |
| Base Station 302-3 | 302-3 | 2:42:39 PM Aug. 14, 1997 |
| Base Station 302-4 | 302-4 | 8:34:09 AM Aug. 12, 1997 |
| Wireless Terminal 303-1 | 302-3 | 5:44:11 PM Aug. 15, 1997 |
| Wireless Terminal 303-2 | 302-3 | 6:13:31 AM Aug. 15, 1997 |

Figure 6:
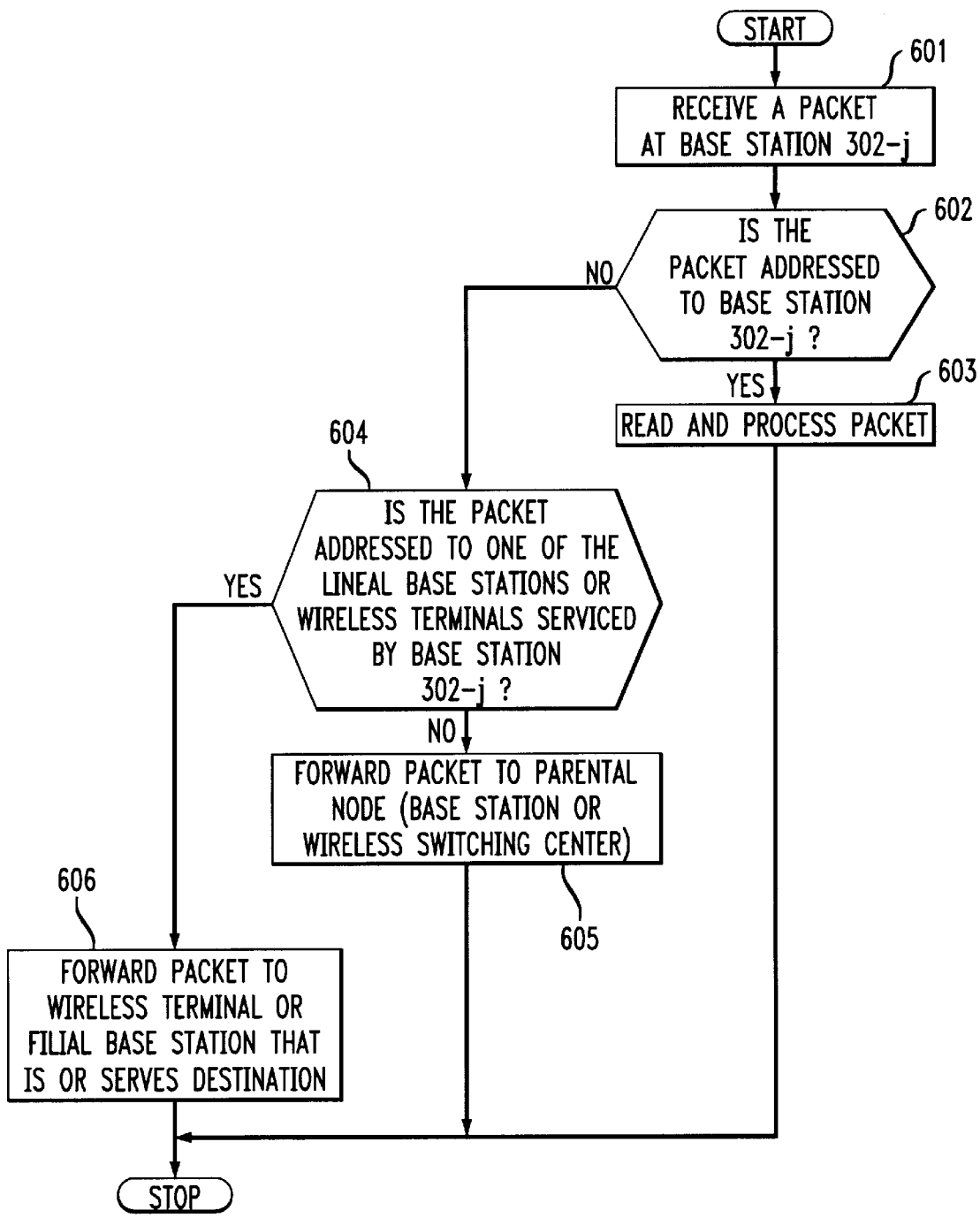
FIG. 6 depicts a flowchart of the operation of base station 302-j as it pertains to the routing of packets received by it.

FIG. 6 depicts a flowchart of the operation of base station 302-j as it pertains to the routing of packets received by it.

At step 601, base station 302-i receives a packet from either: (1) its parental node (a base station or wireless switching center), (2) a filial base station, or (3) a wireless terminal directly serviced by base station 302-i.

At step 602, base station 302-i examines the address on the packet and determines if the packet is destined for itself or not. As is described below, there are several instances in which a packet will be addressed to a base station for administration purposes. If the packet is addressed to base station 302-i, then control passes to step 603, and base station 302-i reads and processes the packet, in well-known fashion. Alternatively, if the packet is not addressed to base station 302-i, then control passes to step 604.

At step 604, base station 302-i determines whether the packet is addressed to one of the lineal base stations or wireless terminals it serves. Base station 302-i can perform this function by comparing the address in the packet to the identities in the first column of Table 2. If the packet is addressed to one of the lineal base stations or wireless terminals it serves, then control passes to step 606; if not, control passes to step 605.

At step 605, base station 302-i has determined that the packet is not addressed to it or to one of the lineal base stations or wireless terminals is serves, and, therefore, base station 302-i forwards the packet to is parental node, whether that parental node is a wireless switching center or another base station.

At step 606, base station 302-i has determined that the packet is addressed to one of the wireless terminals or lineal base stations that it serves, and, therefore, base station 302-i forwards the packet either to the wireless terminal directly or to the filial base station associated with the lineal base station. The identity of that filial base station is found in the second column of Table 2 in the row associated with the destination of the packet.

Therefore, when each wireless switching center follows the regimen in FIG. 5 and each base station follows the regimen in FIG. 6, packets are properly routed from their sender to the appropriate destination. At this point, a few examples may help.

As a first example, when wireless terminal 303-1 and 303-3 in FIG. 3, are involved in a call, packets are exchanged between wireless terminal 303-1 and 303-3 through the illustrative embodiment. When packets are transmitted from wireless terminal 303-1, they proceed through base station 302-3, to base station 302-1, to wireless switching center 201-i, to base station 302-2, and finally to wireless terminal 303-3. Packets from wireless terminal 303-3 to wireless terminal 303-1 traverse the same path but in the opposite direction.

As a second example, when wireless terminal 303-1 and 303-2 are involved in a call, the packets transmitted from wireless terminal 303-1 proceed to base station 302-3, but are then forwarded immediately to wireless terminal 303-2. Analogously, the packets transmitted from wireless terminal 303-2 proceed to base station 302-3 and are then forwarded immediately to wireless terminal 303-1. This example illustrates that when one base station serves (directly or indirectly) both wireless terminals in a call, the packets from the wireless terminals need not be passed to the wireless switching center, but can be routed through the first base station that serves both wireless terminals.

Hand-off

Each time a base station or a wireless terminal is handed off, the topology of the network changes and some of the routing tables in the illustrative embodiment need to be updated so that the illustrative embodiment does not forward a packet to where a base station or wireless terminal was, but where in fact it currently is. In particular, it is important that the updating of the routing tables be handled deftly and in a timely manner so that there is little or no interruption in service to the wireless terminals.

There are four types of hand offs and combinations of hand offs that can occur:

(1) A wireless terminal is handed off from one base station to another;

(2) A base station is handed off from one parental node to another;

(3) A base station is handed off from one parental node to another at the same time that one of its wireless terminals is either entering or leaving its service; and (4) A base station is handed off from one parental node to another at the same time that one of its lineal base stations is either entering or leaving its service.

For each of these four situations, there is a protocol that the illustrative embodiment follows to update the appropriate routing tables in a manner so as to ensure that there is little or no interruption in service to the wireless terminals. The four protocols will be discussed in order.

(1) A Wireless Terminal Is Handed Off From One Base Station To Another

FIG. 7 depicts a flowchart of the steps involved in the protocol for updating the appropriate routing tables when a wireless terminal is handed off from one base station to another. Before step 701, a wireless terminal is being serviced by a first base station in well-known fashion.

At step 701, the wireless terminal determines that it should be handed off from the first base station to a second base station. The wireless terminal can determine that it should be handed off and the identity of the second base station based on the signal strength of the signals received from the base stations, or on the traffic load carried by the first base station or its ancestral base stations, or on other factors, in well-known fashion.

At step 702, the wireless terminal transmits a first message to the first base station, which first message indicates the intention of the wireless terminal to leave the service of the first base station.

At step 703, the wireless terminal transmits a second message to the second base station, which second message indicates the intention of the wireless terminal to leave the service of the first base station and enter the service of the second base station.

At step 704, the second base station transmits a third message to the first base station, via the hierarchical network and ring network (if necessary), of its intention to service the wireless terminal. As the third message propagates from the second base station to the first base station, via the ancestral nodes of both the first base station and the second base station, the ancestral nodes of both the first base station and the second base station update their respective routing tables to consider the hand off from the first base station to the second base station. In particular, the ancestral nodes of the first base station that are not also ancestral nodes of the second base station delete the entry for the wireless terminal from their routing tables. Furthermore, the ancestral nodes of the second base station that are not also ancestral nodes of the first base station create an entry for the wireless terminal in their routing tables.

At step 705, after the first base station receives the third message from the second base station, the first base station transmits a fourth message to the wireless terminal directing it to leave the service of the first base station and enter the service of the second base station. The first base station also deletes the entry for the wireless terminal in its routing table.

At step 706, the wireless terminal leaves the service of the first base station and enters the service of the second base station, at which the hand off of the wireless terminal is complete and all of the appropriate routing tables in the illustrative embodiment have been updated.

(2) A Base Station Is Handed Off From One Ancestral Node To Another

FIG. 8 depicts a flowchart of the steps involved in handing off a base station. This method is more complicated than the method depicted in FIG. 7 because the moving base station may be serving one or more wireless terminals (directly and indirectly) and one or more lineal base stations.

At step 801, the moving base station determines that it needs to be handed off from a first parental node to a second parental node. If there are two or more parental nodes that the moving base station can enter the service of, the moving base station chooses that parental node which has the fewest ancestral nodes, so as to minimize the traffic demand on those ancestral nodes.

At step 802, the first parental node receives a first message from the moving base station of the moving base station's intention to leave its service and enter the service of the second parental node.

At step 803, the first parental node transmits a second message to the second parental node, via the hierarchical network and ring network (if necessary) indicating the intention of the moving base station to leave its service and enter the service of the second parental node.

At step 804, the second parental node transmits a third message to the first parental node, again via the hierarchical network and ring network (if necessary) indicating the intention of the second parental base station to begin servicing the moving base station. As the third message propagates from the second parental node to the first parental node, via the ancestral nodes of both the first parental node and the second parental node, the ancestral nodes of both the first parental node and the second parental node update their respective routing tables to consider the hand off from the first parental node to the second parental node. In particular, the ancestral nodes of the first parental node that are not also ancestral nodes of the second parental node delete the entry for the moving base station from their routing tables. Furthermore, the ancestral nodes of the second parental node that are not also ancestral nodes of the first parental node create an entry for the moving base station in their routing tables.

At step 805, the first parental node transmits a fourth message to the moving base station directing it to leave the service of the first parental node and enter the service of the second parental node.

At step 806, the moving base station leaves the service of the first parental node, stops servicing its own lineal base stations, if any, and enters the service of the second parental node. If the moving base station is directly servicing any wireless terminals, those wireless terminals continue to be serviced by the moving base station (i.e., the directly serviced wireless terminals continue to be serviced by the moving base station). If one or more of the wireless terminals determines that the move of the base station is disadvantageous for any reason, the wireless terminal can then initiate a hand off to a more appropriate base station in accordance with the procedure outlined in FIG. 7.

At step 807, the first parental base station rebuilds the hierarchical network comprising the lineal base stations of the moving base station. This is done by choosing the filial base station of the moving base station with the strongest signal strength, providing to it the identity of all of the lineal base stations and wireless terminals of the moving base station, and directing it to inform them that it is now their ancestral base station.

(3) A Base Station is Handed Off at the Same Time that a Wireless Terminal that it Directly Serves is Handed Off When a base station is being handed off and either: (1) a wireless terminal that it directly serves desires to leave its service, or (2) a wireless terminal decides to enter its service, then the procedures outlined in FIGS. 7 and 8 are insufficient. This is because the concurrent hand off of the base station and the wireless terminal can lead to inconsistencies in the routing tables and, therefore, interruptions in service.

There are four sub-cases of this situation:

A. A wireless terminal attempts to leave the service of a moving base station after the base station has initiated a hand off but before the hand off is complete—In this case, the moving base station forbids the wireless terminal from moving until after the hand off of the moving base station is complete. Typically, this lasts only a fraction of a second and does not affect service to the wireless terminal.

B. A wireless terminal attempts to enter the service of a moving base station after the base station has initiated a hand off but before the hand off is complete—In this case, the moving base station rejects the request until after the hand off of the moving base station is complete. Typically, this lasts only a fraction of a second and does not affect service to the wireless terminal.

C. A base station initiates a hand off from a first parental node to a second parental node after a wireless terminal is in engaged in a hand off to leave the service of that base station—This case is a slight extension of the method depicted in FIG. 8.

In particular, at step 802, when the moving base station transmits a first message to the first parental node, the first message also includes the identity of the wireless terminals served directly by the moving base station and the identity of those wireless terminals that are in the process of leaving the service of the moving base station.

Furthermore, at step 804, when the third message propagates from the second parental node to the first parental node, the ancestral nodes of both the first parental node and the second parental node update their respective routing tables to consider the hand off of both the moving base station and the hand off the wireless terminal from the moving base station. In particular, the first parental node and the ancestral nodes of the first parental node update their routing tables in accordance with three criteria:

1. they delete the entry for the moving base station from their routing table;
2. they delete the entry for each wireless terminal moving with the moving base station; and 3. they delete the entry for each wireless terminal leaving the moving base station if, and only if, the entry in the routing table for that wireless terminal (according to the time stamp) is older than when the first message was sent by the moving base station to the first parental node. Otherwise, the entry is left untouched. The reason is that if the wireless terminal's time stamp entry is newer than that the second message, it implies that the entry was updated after the wireless terminal began its hand off and, therefore, is correct and should remain. In contrast, if the wireless terminal's time stamp entry is older than that the second message, it implies that the second message reached this node before the routing table update message associated with the hand off of the wireless terminal. Therefore, the entry in the routing table must be deleted to keep the various routing tables consistent.

Furthermore, the second parental node and the ancestral nodes of the second parental node update their routing tables to include an entry for the moving base station and each of the wireless terminals moving with the base station. No entry is made for the wireless terminals that are leaving the entry of the base station.

D. A base station initiates a hand off after a wireless terminal is in engaged in a hand off to enter the service of that base station—This case is a slight extension of the method depicted in FIG. 8.

In particular, at step 802, when the moving base station transmits a first message to the first parental node, the first message also includes the identity of the wireless terminals served directly by the moving base station and the identity of those wireless terminals that are in the process of leaving the service of the moving base station.

Furthermore, at step 804, when the third message propagates from the second parental node to the first parental node, the ancestral nodes of both the first parental node and the second parental node update their respective routing tables to consider the hand off of both the moving base station and the hand off the wireless terminal from the moving base station. In particular, the first parental node and the ancestral nodes of the first parental node update their routing tables in accordance must delete their entries for the moving wireless terminal.

By following the above rules, the concurrent hand off of a base station and a wireless terminal can be handled without creating inconsistencies in the routing tables or interruptions in service.

(4) A Base Station Is Handed Off From One Ancestral Node To Another At The Same Time That One Of Its Lineal Base Stations Is Either Entering Or Leaving Its Service When a base station is handed off from one ancestral node to another at the same time that one of its lineal base stations is either entering or leaving its service, the two moves can be treated independently as outlined in FIG. 8.

By following these protocols the illustrative embodiment enables its facilities to be mobile and to be moved where and when they are needed while continuously provides telecommunications service.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A network comprising:
  a plurality of base stations in a hierarchical network that has a wireless switching center as its root, wherein:
  said wireless switching center comprises the identity of its lineal base stations and wirelessly communicates with its filial base stations;
  each of said plurality of base stations comprises the identity of its lineal base stations, if any, and wirelessly communicates with its filial base stations.

2. The network of claim 1 wherein each of said base stations comprises the identity of its parental base station, if any, and wirelessly communicates with a parental base station.

3. The network of claim 1 wherein each of said base stations knows which of its lineal base stations are descendents of which of its filial base stations.

4. The network of claim 1 wherein each of said base stations is capable of providing wireless telecommunications service to one or more wireless terminals and each of said base stations comprises the identity of each wireless terminal to which it provides wireless telecommunications service.

5. A network comprising:
  a plurality of base stations in a hierarchical network, wherein:
  each of said plurality of base stations comprises the identity of its lineal base stations, if any, and wirelessly communicates with its filial base stations; and
  each of said plurality of base stations is capable of providing wireless telecommunications service to one or more wireless terminals and each of said plurality of base stations comprises the identity of each wireless terminal to which one of its lineal base stations provides wireless telecommunications service.

6. A network comprising:
  a plurality of wireless switching centers in a ring network, wherein:
  each of said wireless switching centers wirelessly communicates with a plurality of base stations in a hierarchical network;
  each of said wireless switching centers comprises the identity of its lineal base stations;
  each of said plurality of base stations comprises the identity of its lineal base stations, if any, and wirelessly communicates with its filial base stations.

7. The network of claim 6 wherein each of said base stations comprises the identity of its parental base station, if any, and wirelessly communicates with a parental base station.

8. The network of claim 6 wherein each of said base stations knows which of its lineal base stations are descendents of which of its filial base stations.

9. The network of claim 6 wherein each of said base stations is capable of providing wireless telecommunications service to one or more wireless terminals and each of said base stations comprises the identity of each wireless terminal to which it provides wireless telecommunications service.

10. An network comprising:
  a plurality of wireless switching centers in a ring network, wherein:
  each of said wireless switching centers wirelessly communicates with a plurality of base stations in a hierarchical network;
  each of said plurality of base stations comprises the identity of its lineal base stations, if any, and wirelessly communications with its filial stations; and
  each of said plurality of base stations is capable of providing wireless telecommunications service to one or more wireless terminals and each of said plurality of base stations comprises the identity of each wireless terminal to which one of its lineal base stations provides wireless telecommunications service.

11. A method comprising:

receiving a first message from a wireless terminal at a first base station in a hierarchical network, which first message indicates that said wireless terminal intends to leave the service of said first base station;

receiving a second message from said wireless terminal at a second base station in said hierarchical network, which second message indicates that said wireless terminal intends to enter the service of said second base station; and transmitting a third message from said second base station to said first base station, via said hierarchical network, which third message indicates that said second base station intends to service said wireless terminal.

12. The method of claim 11 further comprising transmitting a fourth message from said first base station to said wireless terminal, which fourth message directs said wireless terminal to enter the service of said second base station.

13. The method of claim 11 wherein said third message informs the ancestral base stations, if any, of said first base station of the intention of said wireless terminal to leave the service of said first base station.

14. The method of claim 11 wherein said third message informs the ancestral base stations, if any, of said second base station of the intention of said wireless terminal to enter the service of said second base station.

15. A method comprising:

receiving a first message from a filial base station at a first parental base station in a hierarchical network, which first message indicates that said filial base station intends to cease being a child of said first parental base station and intends to become a child of a second parental base station, which second parental base station is in said hierarchical network;

transmitting a second message from said first parental base station to said second parental base station, via said hierarchical network, indicating to said second parental base station that said filial base station intends to become a child of said second parental base station; and transmitting a third message from said second parental base station to said first parental base station, via said hierarchical network, indicating that said second parental base station intends to become the new parent of said first filial base station.

16. The method of claim 15 further comprising transmitting a fourth message from said first parental base station to said filial base station directing said filial base station to cease being a child of said first parental base station and become a child of a second parental base station.

17. The method of claim 15 wherein said third message informs the ancestral base stations, if any, of said first parental base station of the intention of said filial base station to cease being a child of said first parental base station and become a child of a second parental base station.

18. The method of claim 15 wherein said third message informs the ancestral base stations, if any, of said second parental base station of the intention of said filial base station to cease being a child of said first parental base station and become a child of a second parental base station.

19. An network comprising:

a plurality of base stations in a hierarchical network that has a wireless switching center as its root, wherein:

said wireless switching center comprises the identity of its lineal base stations and wirelessly communicates with its filial base stations.

20. The network of claim 19 wherein:

each of said base stations comprises the identity of its filial base stations, if any, and wirelessly communicates with its filial base stations; and each of said base stations comprises the identity of its lineal base stations, if any.

21. The network of claim 19 wherein each of said base stations is capable of providing wireless telecommunications service to one or more wireless terminals and each of said base stations comprises the identity of each wireless terminal to which one of its lineal base stations provides wireless telecommunications service.

22. A network comprising:

a wireless switching center that is the root of a hierarchical network of base stations and that wirelessly communicates with its filial base stations; and wherein said wireless switching center comprises the identity of its lineal base stations.

23. The network of claim 22 wherein:

each of said base stations comprises the identity of its filial base stations, if any, and wirelessly communicates with its filial base stations; and each of said base stations comprises the identity of its lineal base stations, if any.

24. The network of claim 22 wherein each of said base stations is capable of providing wireless telecommunications service to one or more wireless terminals and each of said base stations comprises the identity of each wireless terminal to which one of its lineal base stations provides wireless telecommunications service.

* * * * *